Figure 1:
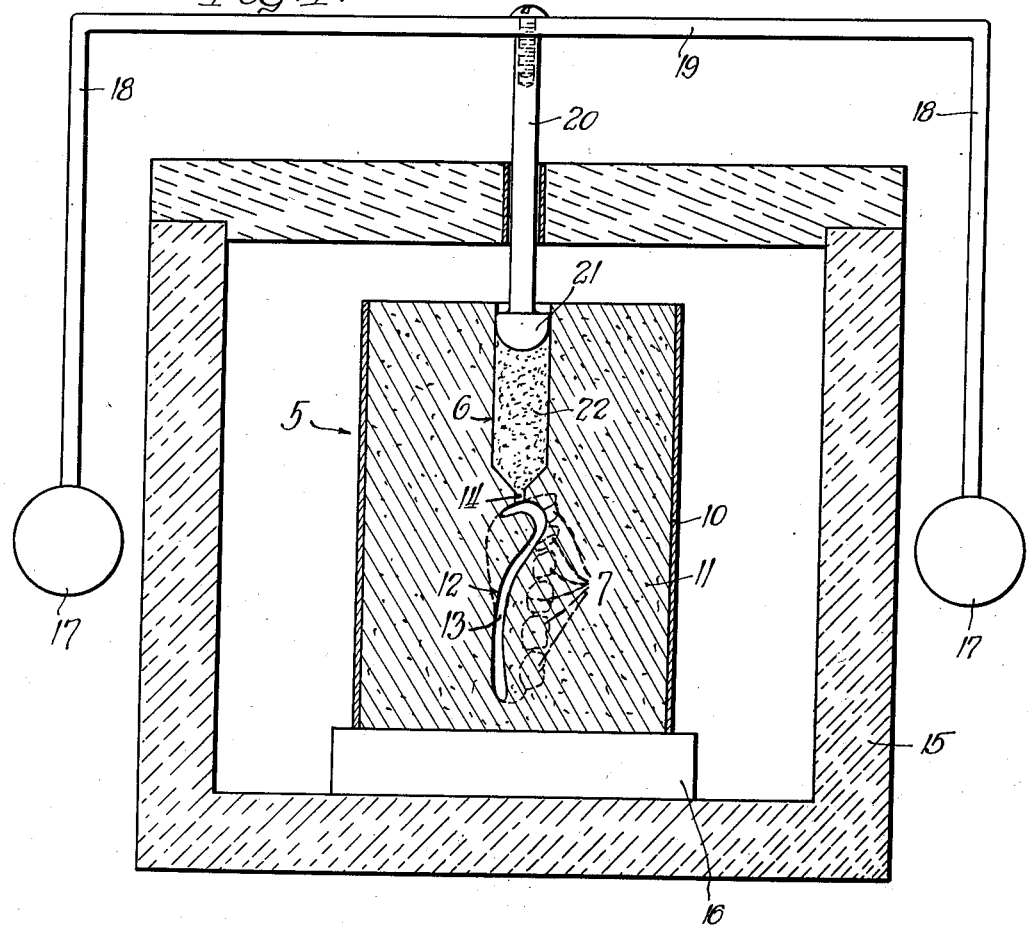

April 2, 1940.    R. W. ERDLE    2,195,452
METHOD OF MAKING ARTICLES OF PORCELAIN
Filed Nov. 4, 1935

Inventor:
Reiner W. Erdle.
By Brown, Jackson, Boettcher & Dienner
Attys

Patented Apr. 2, 1940

2,195,452

UNITED STATES PATENT OFFICE 2,195,452

METHOD OF MAKING ARTICLES OF PORCELAIN

Reiner W. Erdle, Chicago, Ill., assignor, by mesne assignments, to Dental Research Corporation, a corporation of Illinois Application November 4, 1935, Serial No. 48,071

2 Claims. (Cl. 18—55)

This invention relates to a method of and means for making articles of porcelain and the like, and particularly porcelain dentures and dental parts.

It is to be understood, of course, that the invention may be employed with other materials and for forming other articles than dentures and dental parts.

The invention relates especially to a process in which porcelain is formed to the desired shape in a fixed mold cavity, i. e., a mold cavity in which the surrounding walls are integrally connected throughout or at least permanently fixed as distinguished from a mold cavity formed by complementary mold members adapted to press the porcelain therebetween, as disclosed in my co-pending application Serial No. 27,566, filed June 20, 1935.

Fixed cavity molds have been used before in the art, to which the present invention appertains, but heretofore it has been customary to melt the material to be molded adjacent the inlet to the mold cavity, usually by means of a torch, and thereafter to force the molten material through a small sprue or gate into the mold cavity. According to these prior practices which have included imposition of the desired force centrifugally as well as by means of a weighted member operating in a suitably formed opening constituting a part of or connected to the sprue opening, the heat and pressure have been applied in alternate steps. As a result, it has usually been necessary to overheat the material to be molded in an effort to maintain same in condition to be pressed into the mold cavity in spite of the chilling which occurs. Even with this overheating, the chilling which has occurred in pressing the material into the mold cavity has limited these practices to making small and relatively thick restorations because, as a result of this chilling, the mold cavity is not completely filled as desired, particularly where this cavity is relatively thin and of relatively large area.

These prior practices of applying the heat and pressure in alternate steps, and the accompanying discontinuance of the step of applying heat to the material during the step of forcing the molten material into the mold cavity, have precluded the making of large restorations as well as restorations or other articles which are relatively thin. If the desired restoration or other article is large and thin and the heat discontinued while the molten material is forced into the mold cavity, the material will chill even where overheated, as already pointed out, and will not fill the mold cavity. And some materials, such as porcelain, cannot be overheated because overheating will discolor and weaken the same, and this is highly objectionable.

The object of the present invention is to provide a process and means adapted for molding articles of porcelain and the like in fixed molding cavities and, at the same time, to thin form and large sizes as desired, and without overheating the material to be molded.

By means of the present invention it is possible to produce a full porcelain plate which is exceedingly accurate and which, at the same time, may be exceedingly thin, and is strong, dense, and without objectionable discoloration.

According to my present invention, I form the fixed cavity mold of a highly refractory material which will withstand high temperatures without disintegration, and then I heat the material to be molded and the mold cavity with as little heat as required to enable the material to flow into and fill the mold cavity and, simultaneously with the application of such heat, press the material slowly and continuously into the mold cavity to fill the same throughout.

Figure 2:
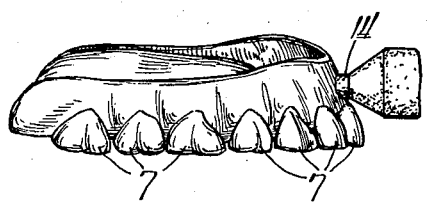

Further objects and the details and advantages of the invention will be apparent from the following detailed description, taken in connection with the accompanying drawing, in which:

Figure 1 is a more or less diagrammatic sectional view showing the method of and means for forming the denture, dental part, or other article, in accordance with the present invention; and Figure 2 is a perspective view of a completed denture formed according to the present invention.

In carrying out my invention, the first step is to make a pattern of meltable material, such as wax, and of a shape and thickness corresponding to the shape and thickness of the desired plate or other articles. This pattern has a sprue formed of meltable material, such as wax, projecting from the center of the front of the pattern for forming in the mold 5 the gate 6 through which the porcelain or other material to be molded is introduced.

Stock teeth 7 are then applied or set in the wax pattern. Teeth without metal pins or the like are preferred to avoid oxidation or other undesirable action in molding the porcelain, as will hereinafter appear. Instead of stock teeth formed of porcelain or the like, teeth of wax or other meltable material may be used to produce a one-piece denture.

The pattern is preferably coated with a parting material which will not combine with the fused porcelain and which, at the same time, will give the mold cavity a smooth finish. One satisfactory coating material may be formed by mixing about ten to twenty parts water to one part silicate of soda and powdered flint to make a paste that may be sprayed upon the pattern or otherwise applied as a coating thereto, as by painting the same on the pattern. When this coating is applied the water evaporates and leaves a coating which will not combine with the fused porcelain and which, at the same time, gives the mold cavity a smooth finish which cannot be obtained with the rough outer investment material. It is thought that this coating absorbs the tetra-ethyl binder of the investment material.

Instead of making this coating of the material above described, it may be made of a mixture of about ten to twenty parts water to one part tetra-ethyl silicate, which is hydrolyzed, and powdered flint, or about ten to twenty parts water to one part tetra-ethyl silicate, which is hydrolyzed, and powdered flint and asbestos to make a paste that may be applied to the pattern as above set forth.

In making up the coating, clay or any other highly refractory material which will not combine with the fused porcelain and which is finer than the rough outer investment material may be used with or in lieu of the flint content of the coating.

The coated pattern with the teeth 7 set therein is then placed in an investment flask or ring 10 and embedded in the investment material forming the body 11 of the mold 5. The ring 10 is preferably made of "Nichrome" or any metal alloy which retains its strength at high temperatures. To protect the ring 10 against oxidation and so that the metal will not burn off when the ring is subjected to high temperatures for relatively long time intervals, this ring is preferably coated with a clay wash or other wash suitable for this purpose. This wash may be applied by spraying the same on the ring or dipping the ring therein, or otherwise as desired.

Instead of making the ring 10 of a metal alloy, this ring may be made of fire-clay or any ceramic material which retains its strength at high temperatures.

The body 11 of the mold 5 is preferably formed of an investment material which has thermal characteristics which are compatible with the thermal characteristics of the porcelain which is being molded. Breakage and inaccuracy of the product are avoided and the results are highly satisfactory.

The refractory mold material which I employ has a thermal expansion upon heating, as distinguished from a permanent expansion or contraction, so that when it comes back to room temperature it will have the original dimensions. That is, there preferably is no appreciable permanent expansion or contraction as a result of heating, but the mold material expands as a result of thermal expansion while it is heated, and thereupon contracts again upon cooling to room temperature. This is important because the porcelain which is being molded is necessarily at the same high temperature as the mold while it is being molded, and it must necessarily shrink when it is brought down to room temperature.

The thermal expansion of the mold may be controlled, depending upon the composition of the mold material. Fused quartz may be added to the mixture to reduce the thermal expansion, or cristobalite may be added to increase the expansion. Also, other materials, such as alumina, may be used in admixture for similar purposes.

Fused quartz, ground to pass through a sixty-mesh sieve, with some larger and finer particles, and an addition of approximately one-fifth by volume of finely ground pure flint makes an excellent refractory body having the properties and advantages above set forth. This material has thermal characteristics compatible with the thermal characteristics of the porcelain upon heating to the relatively high temperatures where the porcelain starts to flow. These temperatures are approximately 1700° F. to 2000° F. for low fusing porcelain, approximately 2000° F. to 2300° F. for medium fusing porcelain, and approximately 2300° F. to 2500° F. for high fusing porcelain.

Ground fire-brick of coarser mesh, i. e. about twenty to forty mesh, may be employed in lieu of the fused quartz referred to in the preceding paragraph.

This highly refractory investment material is used in amount to form the body 11 of the mold 5, and I admix therewith in amount to serve as a binder for the refractory investment material, as disclosed in my copending application Serial No. 27,566, filed June 20, 1935, a binder such as that more fully disclosed in United States Letters Patent No. 1,909,008, dated May 16, 1933, to Charles H. Prange.

As disclosed in the foregoing patent, this binder is preferably composed entirely of pure silica gel. As pointed out there, silica gel, as is well known, is a colorless and transparent substance which exists in varying degrees of firmness. When it embodies a large amount of water it is soft and pasty, like gelatine, and when it is dehydrated it becomes extremely hard, glassy and brittle.

Silica gel is available on the market in its hard and glassy condition, but so far as is now known there is no practical way of utilizing it in this condition to serve the purpose of the prior patent, or for the purpose of the present application. This form of the mold body 11 of the present invention therefore involves the procedure of the prior patent whereby pure silica gel may be caused to be generated, in situ, in a plastic mixture, as will hereinafter appear.

As in the above patent, I resort to the characteristic of colloidal silicic acid to undergo a spontaneous sort of transformation, whereby silica gel is generated or formed in a continuously increasing manner. The exact chemical transformation which silicic acid undergoes is not fully understood, but there is apparently a spontaneous and increasing aggregation of colloidal silica particles resulting, ultimately, in a complete conversion of the silicic acid into what is commonly known as silica gel.

The binder which I employ in accordance with this form of the mold body of the present invention is a substance which is adapted, in the foregoing general manner, to form or generate pure silica gel. More specifically, it has been found that certain organic silicates, preferably silicon esters, when hydrolyzed and slightly acidified, are admirably characterized by the ability to undergo a spontaneous transformation with the ultimate generation of nothing more than pure silica gel.

For example, in the preferred method of forming the investment material for the mold body 11, a silicon ester of the general class which includes, e. g. tetra-ethyl silicate, tetra-butyl silicate, tetra-methyl silicate, glyceryl silicate, or diglycol silicate, is conditioned or treated by the addition of a slight amount of an acidifying agent, and, by the addition of water, if necessary, to produce a liquid or semi-liquid substance which is satisfactorily usable as a binder to form a paste or plastic mixture with the refractory filler above described. Such mixture is adapted to be poured, handled, or manipulated in a suitable manner, and is characterized by an ability to set or harden without a drying out process. This action is probably due to a formation of a colloidal silicic acid and to a subsequent spontaneously increasing transformation of the silicic acid into a silica gel, the latter ultimately becoming more and more dehydrated until it is entirely solid.

The setting of the material may be accelerated in a variety of ways, as, for example, by heat; but, in practicing the present invention, I prefer to incorporate with the plastic mixture a slight amount of a suitable accelerating agent whereby the setting is sufficiently complete to permit handling within a short time. Magnesium oxide powder may be used for the accelerating purpose, although other accelerating agents are contemplates within the scope of the present invention. Hexamethylenetetramine ($C_6H_{12}N_4$) is a very satisfactory accelerator and has the advantage that, being organic, it will be completely eliminated in the firing operation.

I find that instead of using an accelerator, the desired accelerated setting may be obtained by increasing the acidity of the binder.

The general nature of the preferred investment material of the present invention and the essential features thereof, as well as the numerous advantages achieved thereby, will be more fully understood by more specifically setting forth an illustrative example. It is to be understood, however, that the procedural steps and the proportions of the parts and other details, as hereinafter set forth, are given merely by way of illustration and are capable of wide variations to suit different requirements.

One method of making the mold or investment material which has proven to be satisfactory consists in first producing a binder by properly treating and conditioning liquid tetra-ethyl silicate. With about eight volumes of this organic silicate I mix about one volume of water and a trace of a suitable acidifying agent, e. g. a few drops of hydrochloric or sulphuric acid, thereby inducing a partial hydrolysis. Since these liquids will not readily mix, it is preferable to add a small amount of a material which is miscible with all. For example, I prefer to add one or two volumes of ethyl alcohol or acetone, whereby a true and thorough mixture of the liquid is readily produced. This common solvent may be omitted and high speed mechanical agitation employed to obtain the desired miscibility. The amount of acid to be used will vary with requirements but should be, preferably, just sufficient to make the mixture very slightly acid when tested with litmus paper.

The mixture may then be stirred on a water bath until a sample, upon drying upon the hand, for example, is sticky to the touch, or otherwise tested and found to be in suitable condition. Usually a period of one to two hours will suffice. This produces the binder heretofore referred to and having the characteristics hereinbefore mentioned. And this binder may be used immediately, or it may be stocked for a reasonable period of time, to be used when required.

In making up the investment material, I mix approximately four parts of the investment material, as above described, with about one part of the liquid binder. There will be some variation in the amount of binder used, depending upon the type of material and upon the type of investment material, the foregoing proportions being suitable for making up an investment material in accordance with this invention and for the purposes herein set forth. The excess binder may be readily eliminated by vibrating the composition to cause the solid parts thereof to settle and to cause the excess liquid to rise to the top. The liquid binder which comes to the top in the vibrating process may be poured off. It is to be understood that to start with the proportions of one part liquid binder to four parts of refractory filler are approximately correct, but that in the manipulative procedure the mass of filler with the liquid binder is subjected to vibration over a period of time which settles the filler in a compact mass at the bottom and changes the liquid solid ratio from the proportions when first mixed. If preferred, a relatively greater proportion of filler may be used, in which case the plastic composition of refractory filler and binder may be produced by kneading it.

This plastic material will normally set in a period of three to six days, but the speed of initial setting is preferably increased by either of two methods.

One satisfactory procedure lies in heating the mixture in an oven to approximately 110–115° C. This heating apparently speeds the transformation of the colloidal silicic acid into colloidal silica particles, and an initial set can be secured in approximately an hour or less.

The method which I prefer to use to speed the initial setting of the mixture is to incorporate with the pasty material a trace of suitable accelerating agent. While various materials will do, I have found an accelerator of the class hereinbefore set out to be extremely satisfactory and preferable for this purpose. A trace or slight amount of this accelerating agent is sufficient, and I prefer to use it by mixing it directly with the refractory filler before the pasty material is produced. In carrying out this procedure, I use about one part by weight of the accelerator to one thousand parts by weight of the refractory investment material. This is equivalent to one-tenth of one per cent by weight. The composition, when thus produced, takes an initial set in about half an hour or less.

While I cannot fully explain the action of the accelerating agent, I have found that a variety of accelerators may be used. These accelerators may be of a character to be completely or practically eliminated by heat, thereby leaving the mold free, or substantially free, of extraneous inorganic solids. Where the accelerating agent is a liquid it is preferably mixed with the binder, and where it is a solid it is preferably mixed with the refractory filler.

After making the investment material as above set forth, this material is poured or otherwise introduced in plastic form into the flask or ring 10 in which the coated pattern with the teeth 7 set therein has been placed, and the pattern and teeth and sprue or gate forming part are completely embedded in the investment material. After the ring 10 has been filled with investment material, with the sprue or gate forming part projecting therefrom, the mold body 11 is set and the wax pattern is eliminated, leaving the fixed molding cavity 12 lined with the coating 13 for obtaining the desired smooth finish and which, at the same time, will not combine with the fused porcelain, and the sprue or gate opening 6, opening vertically from the top of the mold. The sprue or gate opening 6 is preferably of a diameter of about one-half to three-quarters of an inch, and is preferably restricted at 14 to facilitate removal of the porcelain projection formed at the lower end of the sprue or gate opening in molding the porcelain in the mold cavity.

After the foregoing operations, the desired amount of porcelain, preferably in powdered form although solid porcelain may be used, is introduced into the sprue or gate opening 6 preferably in excess of the amount necessary to fill the mold cavity 12. The fixed cavity mold is then placed in a suitable furnace, indicated more or less diagrammatically at 15. The interior of the furnace 15 is provided with a base 16 for supporting the mold body in its flask or ring 10 in raised position. Where the teeth 7 are stock teeth, the mold body 11 supports these teeth in proper position with respect to each other during the time the porcelain is being placed in the mold and while the porcelain is heated and pressed into the cavity to fill the same and until it has cooled and set with the teeth firmly anchored therein.

The furnace 15 is then heated with as little heat as required to enable the porcelain to flow into and fill the mold cavity, and simultaneously, with the application of such heat, the porcelain is pressed slowly and continuously into the mold cavity 12 to fill the same throughout. The desired pressure for pressing the porcelain into the mold gravity 12 may be imposed by weights 17 at the lower ends of arms 18 on a frame 19 which may be disposed externally of the furnace as shown. In one practical embodiment of the invention, a weight 17, of about fourteen pounds, at the lower end of each of the arms 18 was found to be satisfactory. The lower end of the center arm 20 rests upon a plunger or button 21 which fits relatively snugly in the sprue or gate opening 6 and presses the porcelain, indicated at 22, ahead of it and into the mold cavity 12 under the influence of the weights 17. The arm 20 operates slidingly through an opening in the upper wall of the furnace 15. This arm 20 may be formed of non-metallic material, such as fire-clay or other ceramic material.

In a practical embodiment of the invention, the heat was raised until the plunger 21 started to move downwardly and the molding process was carried out with a temperature from approximately 100° F. to 200° F. below the full fusing point of the porcelain. This is an important aspect of the present invention. Overheating with the objectionable results previously mentioned is avoided, and a strong, dense porcelain without discoloration is assured. At the same time, by pressing the porcelain into the mold cavity 12 while heated sufficiently to flow into and fill said cavity and without discontinuing the heat while the porcelain is being pressed into the cavity, chilling of the porcelain is avoided, and exceedingly thin cavities of large extent may be filled throughout. And the resulting porcelain part is of uniform and excedingly fine physical characteristics.

After the mold cavity is completely filled, the molded article is allowed to cool slowly and, when cooled, is removed from the mold. The investment material forming the mold body 11 sinters but does not fuse during the firing process. Therefore it can be removed from the denture or other article with a steel brush, or by picking it away from the article. At the same time this investment material has a high crushing strength.

After the denture, indicated as a full denture in Figure 2, with its teeth 7 is removed, the porcelain part 22 and, if desired, the teeth 7 may be stained and glazed to suit the requirements.

While the material forming the mold body 11 constitutes an important part of the present invention in that it will withstand, without disintegration, the high temperatures necessary to enable the porcelain to flow into and fill the mold cavity while the porcelain is being pressed into such cavity, I do not intend to be limited to the precise mold material above described.

An investment in which I employ silicate of soda as a binder may be used, and a slight amount of hydrochloric acid or formaldehyde may be used as a setting accelerator.

Instead of using liquid binders, I contemplate using the casting investment disclosed in the patent to Charles A. Overmire, No. 1,719,276, dated July 2, 1929, alone, or mixed with suitable filler.

When using a low fusing porcelain, a common plaster or hydrocol investment may be used.

I also contemplate the use of aluminous cement as disclosed in the copending application of Charles H. Prange, Serial No. 721,550, filed April 20, 1934.

I do not intend to be limited to the precise details shown or described.

I claim:

1. In a process for making a mold for porcelain articles, the steps which comprise making a pattern, coating the pattern with a material which will not combine with fused porcelain and which will give the mold cavity a smooth hard finish, investing the pattern in a body of investment material, setting the body of investment material, transferring the coating material from the pattern to the investment material, and eliminating the pattern to form a smoothly coated mold cavity.

2. The method of forming an article of porcelain-like material in a mold having a fixed mold cavity and a gate which comprises heating the fixed mold cavity and the gate, introducing the porcelain-like material into the gate where, by the heat applied to heat the fixed mold cavity and the gate, the porcelain-like material is rendered sufficiently fluid to flow from the gate into the fixed mold cavity, subjecting the porcelain-like material thus heated to pressure to force the same relatively slowly into all portions of the fixed mold cavity to fill the same, said method being characterized by the fact that the fixed mold cavity and the mass of porcelain-like material are maintained at a raised temperature while the porcelain-like material is forced into the mold cavity and until said cavity is filled with the porcelain-like material, said temperature being not substantially higher than the temperature at which incipient fusion of the porcelain-like material takes place.

REINER W. ERDLE.